United States Patent [19]

Shah

[11] Patent Number: 6,154,740
[45] Date of Patent: Nov. 28, 2000

[54] SYSTEM AND METHOD FOR DISPLAYING A SORTED LIST BY DETERMINING SORT POINTS IN A KEY FIELD

[75] Inventor: Nitin J. Shah, Scotch Plains, N.J.

[73] Assignee: Lucent Technologies, Inc., Murray Hill, N.J.

[21] Appl. No.: 09/082,026

[22] Filed: May 20, 1998

[51] Int. Cl.[7] .................................................. G06F 17/30
[52] U.S. Cl. .............................. 707/7; 345/353; 345/352
[58] Field of Search ................................ 707/7, 503, 512; 345/347, 353, 352

[56] References Cited

U.S. PATENT DOCUMENTS

| | | | |
|---|---|---|---|
| 5,396,621 | 3/1995 | MacGregor et al. | 345/347 |
| 5,600,825 | 2/1997 | Atkins et al. | 707/7 |
| 5,706,449 | 1/1998 | Liu et al. | 345/326 |
| 5,937,422 | 8/1999 | Nelson et al. | 392/416 |

*Primary Examiner*—Thomas G. Black
*Assistant Examiner*—William Trinh

[57] ABSTRACT

A system for, and method of, displaying a sorted list on a display device and a computer incorporating the system or the method. In one embodiment, the system includes: (1) a sort-point identifier that scans a key field of a sorted list and determines sort-points in the key field and (2) a key field marker, associated with the sort-point identifier, that associates marks with the key field based on the sort-points and causes at least a portion of the sorted list and the associated marks to be displayed on the display device.

20 Claims, 3 Drawing Sheets

SYSTEM AND METHOD FOR DISPLAYING A SORTED LIST BY DETERMINING SORT POINTS IN A KEY FIELD

TECHNICAL FIELD OF THE INVENTION

The present invention is directed, in general, to computer systems and, more specifically, to a system and method for displaying a sorted list and a computer incorporating the system or the method.

BACKGROUND OF THE INVENTION

Sorted lists and the ability to sort lists is a growing interest because there is both an actual and perceived value of time and effort savings. For example, as the requirement to shorten business cycle times grows, the capability to quickly sort lists and be able to clearly display them in a variety of marked formats is becoming increasingly valuable to a spectrum of business users. Also, users involved in emergency, security and safety situations are constantly looking for enhancements in the presentation of both data and information of which enhanced sorting capability would play a key role.

The capability to sort lists is presently available. However, the marking capabilities which may be used to delineate the sorted lists leave much to be desired with respect to attributes. The ability to generate sorted lists in e-mail exists today. By mouse-clicking on the date or sender, a sorted list may be generated. Often, the delineation between the sorted categories is far from obvious. A list typically appears as a continuum even though the list has been sorted.

The capability to sort lists based on a hierarchy of key fields or other sort parameters is generally not currently available. For example, a first level sort may be desired by name. Then, a second level sort within the first level sort (i.e., within each grouping of names) using date as a sort parameter may be desired. Additionally, a third level sort, such as time, within the first and second levels may be desired. Clearly, the ability to accomplish many levels of sorting within easily "nested" sort parameters is attractive to a broad set of users. Accordingly, what is needed in the art is a way to sort and display lists to improve their readability and useability.

SUMMARY OF THE INVENTION

To address the above-discussed deficiencies of the prior art, the present invention provides a system for, and method of, displaying a sorted list on a display device and a computer incorporating the system or the method. In one embodiment, the system includes: (1) a sort-point identifier that scans a key field of a sorted list and determines sort-points in the key field and (2) a key field marker, associated with the sort-point identifier, that associates marks with the key field based on the sort-points and causes at least a portion of the sorted list and the associated marks to be displayed on the display device.

The present invention therefore introduces the broad concept of revealing to a user the locations of the sort-points in a sorted list to aid the user in scanning and drawing information from the list.

In one embodiment of the present invention, the marks are selected from the group consisting of: (1) alphanumeric characters, (2) special characters, (3) graphics characters, (4) icons, (5) typefaces and (6) text attributes. If the marks are characters, the characters may be displayed adjacent the sort-points. The sort-points may be delineated by being displayed in a different typeface (or font) or may have color or style attributes that set them apart. Alternatively, the marks may associate the remaining portions of the sorted list with the sort-points; all records falling in a particular sorted category may be denoted with a particular character, typeface or attribute.

In one embodiment of the present invention, the marks are spaces separating the sort-points. Thus, the sorted list may simply be divided into sorted sections.

In one embodiment of the present invention, the sort-point identifier and the key field marker are associated with a computer program selected from the group consisting of: (1) an electronic mail program, (2) a word processor, (3) a contact manager and (4) an operating system. Those skilled in the art will readily perceive, however, that the present invention is employable with all conventional or later-developed computer programs that call for a sorted list to be displayed.

In one embodiment of the present invention, the key field is selectable. Thus, a user may change the key field; in such case, it is advantageous that the sort-point identifier and key field marker re-identify and re-mark the list accordingly to reflect the new sort basis.

In one embodiment of the present invention, the key field is selected from the group consisting of: (1) sender name, (2) date sent, (3) subject, (4) filename, (5) file extension, (6) file size, (7) file type, (8) date created and (9) date modified. Of course, any field may be sorted and delineated to advantage.

In one embodiment of the present invention, the system further includes a computer having data processing and storage circuitry and the display device. In an embodiment to be illustrated and described, the computer is a personal computer (PC) having color graphics capability.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
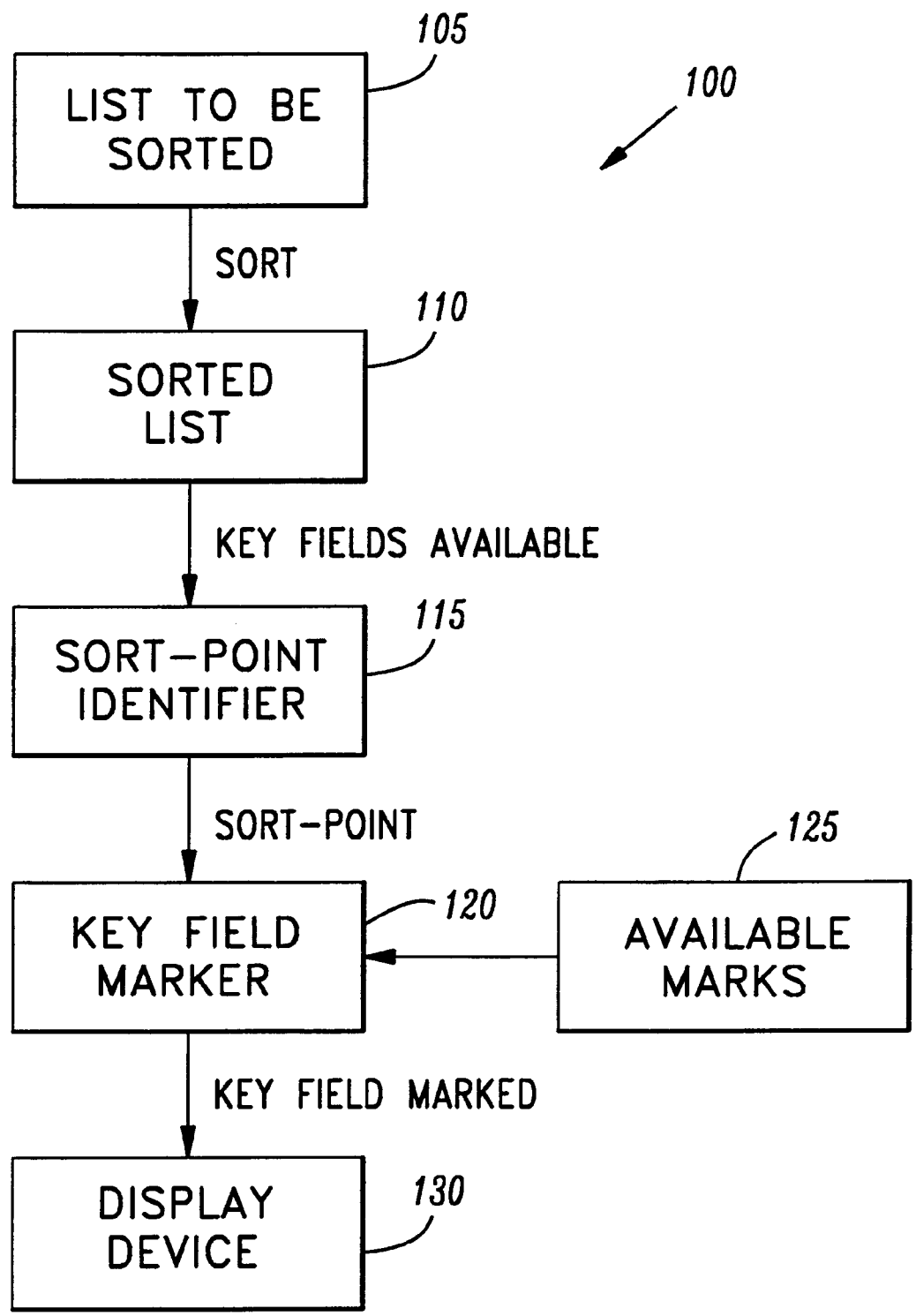
FIG. 1 illustrates a system for displaying a sorted list on a display device.

Referring initially to FIG. 1, illustrated is a system 100 for displaying a sorted list on a display device. The system 100 of this embodiment includes a list to be sorted 105, a sorted list 110, a sort-point identifier 115, a key field marker 120 having access to available marks 125 and a display device 130. The system 100 may be incorporated into a computer, having data processing and storage circuitry and the display device 130, where the sort-point identifier 115 scans a key field of a sorted list 110 and determines sort-points in the key field. The key field marker 120, associated with the sort-point identifier 115, associates marks with the key field based on the sort-points and causes at least a portion of the sorted list and the associated marks to be displayed on the display device 130. The computer may be a personal computer (PC) having color graphics capability.

The present invention therefore introduces the broad concept of revealing to a user the locations of the sort-points in a sorted list to aid the user in scanning and drawing information from the list. In this embodiment of the present invention, the available marks 125 are selected from the group consisting of alphanumeric characters, special characters, graphics characters, icons, typefaces and text attributes. If the marks are characters, the characters may be displayed adjacent to the sort-points. The sort-points may be delineated by being displayed in a different typeface (or font) or may have color or style attributes that set them apart. Alternatively, the marks may associate the remaining portions of the sorted list with the sort-points. All records falling in a particular sorted category may be denoted with a particular character, typeface or attribute. Additionally, the marks may be spaces separating the sort-points. Thus, the sorted list may simply be divided into sorted sections.

The sort-point identifier 115 and the key field marker 120 are associated with a computer program selected from the group consisting of an electronic mail program, a word processor, a contact manager and an operating system. Those skilled in the art will readily perceive, however, that the present invention is employable with all conventional or later-developed computer programs that call for a sorted list to be displayed. In this embodiment, the key field is selectable. Thus, a user may change the key field. In such case, it is advantageous that the sort-point identifier 115 and the key field marker 120 re-identify and re-mark the list accordingly to reflect the new sort basis. The key field is selected from the group consisting of sender name, date sent, subject, filename, file extension, file size, file type, date created and date modified. Of course, any field may be sorted and delineated to advantage.

Figure 2:
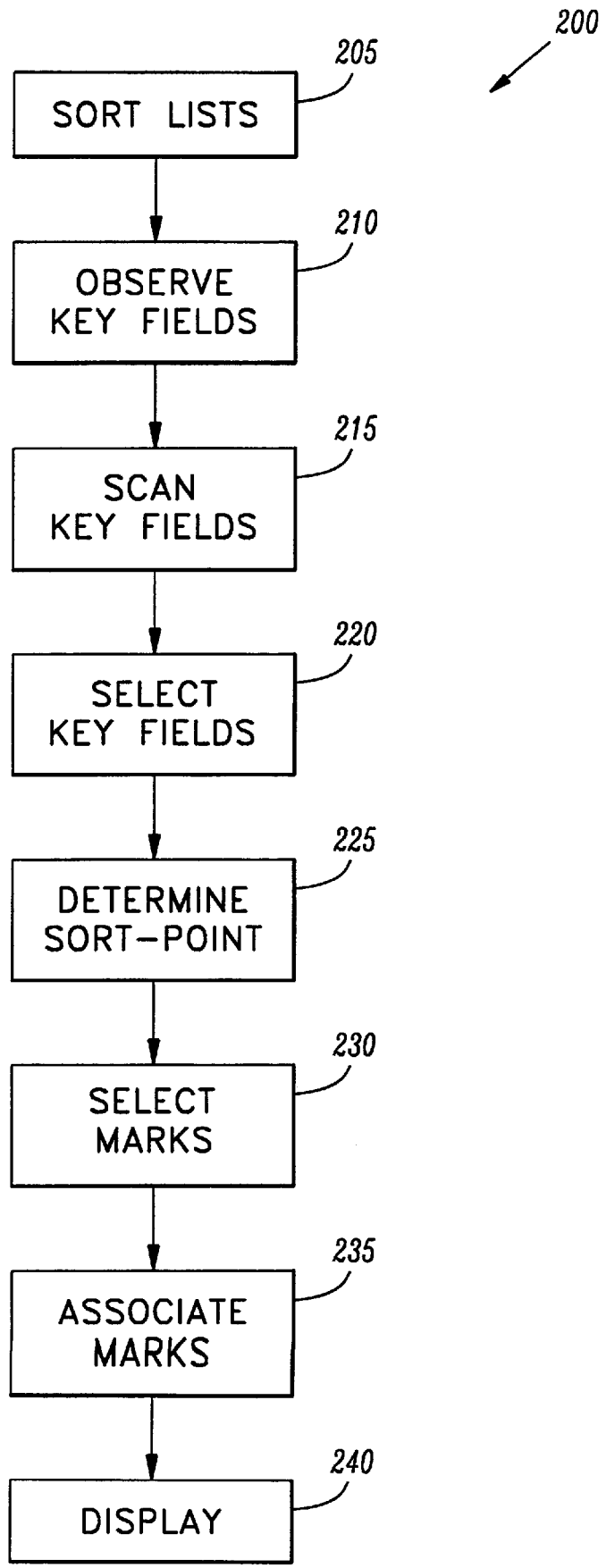
FIG. 2 illustrates a flow diagram which shows a method of displaying a sorted list on a display device according to one embodiment of the present invention.

Turning now to FIG. 2, illustrated is a flow diagram 200 which shows a method of displaying a sorted list on a display device according to one embodiment of the present invention. The method depicted in the flow diagram 200 shows a sequence of steps that includes SORT LISTS (a block 205), OBSERVE KEY FIELDS (a block 210), SCAN KEY FIELDS (a block 215), SELECT KEY FIELD (a block 220), DETERMINE SORT-POINT (a block 225), SELECT MARKS (a block 230), ASSOCIATE MARKS (a block 235) and DISPLAY (a block 240). The method shown carries out the scanning, determining, associating and causing necessary to accomplish displaying of key fields of a sorted list with the appropriate marks. This may be accomplished in a computer having data processing, storage circuitry and a display device using a computer program where SORT LISTS (the block 205) selects from the group consisting of an electronic mail program, a word processor, a contact manager and an operating system in this embodiment.

The key fields are observed in OBSERVE KEY FIELDS (the block 210) and then scanned in SCAN KEY FIELDS (the block 215) in order to do a selection of the key field in SELECT KEY FIELD (the block 220). The key field is selected from the group consisting of sender name, date sent, subject, filename, file extension, file size, file type, date created and date modified. The sort-points are then determined in DETERMINE SORT-POINTS (the block 225) and the desired marks are selected in SELECT MARKS (the block 230). In SELECT MARKS (the block 230), the marks may be selected from the group consisting of alphanumeric characters, special characters, graphics characters, icons, typefaces and text attributes. Additionally the marks may also be spaces separating said sort-points.

Figure 3:
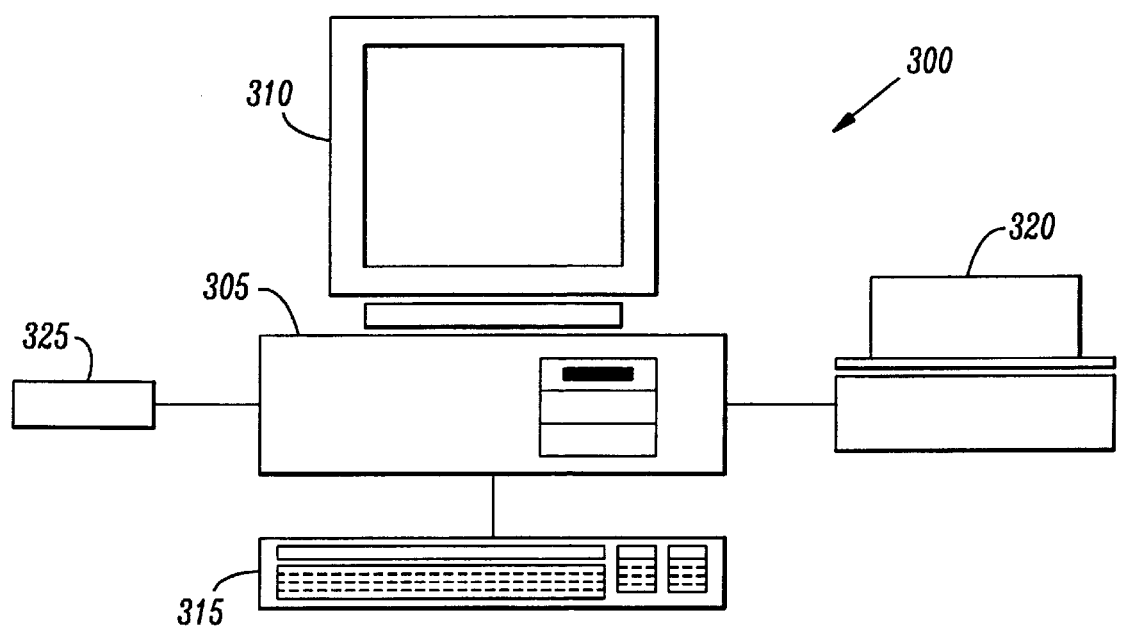
FIG. 3 illustrates a computer comprising data processing, storage circuitry and a display device that contains a sorted list.

Turning now to FIG. 3, illustrated is a computer 300 comprising data processing, storage circuitry and a display device that contains a sorted list. The general-purpose computer 300 includes a processor and storage unit (PSU) 305, a display device 310, a keyboard 315, a printer 320 and a modem 325 for use with a computer network. The PSU 305 contains all of the elements required to use and operate the appropriate software. The display device 310 allows the results and interactions of the PSU 305 to be displayed for interpretation by the user. The keyboard 315 allows the user to interact with the PSU 305, and the printer 320 provides for generating hardcopy files related to the software being used. The modem 325 allows data and information to be interchanged with other sites via the computer network.

In the computer 300, the display device 310 is capable of displaying a sorted list. The PSU 305 includes a sort-point identifier that scans a key field of a sorted list and determines sort-points in the key field which is selectable. Additionally, a key field marker, associated with the sort-point identifier, associates marks with the key field based on the sort-points and causes at least a portion of the sorted list with its associated marks to be displayed on the display device 310. The marks are selected from the group consisting of alphanumeric characters, special characters, graphics characters, icons, typefaces and text attributes. The marks may also be spaces separating the sort-points.

The sort-point identifier and the key field marker are associated with a computer program selected from the group consisting of an electronic mail program, a word processor, a contact manager and an operating system. Additionally, the key field is selected from the group consisting of sender name, date sent, subject, filename, file extension, file size, file type, date created and date modified.

From the above, it is apparent that the present invention provides a system for, and method of, displaying a sorted list on a display device and a computer incorporating the system or the method. In one embodiment, the system includes: (1) a sort-point identifier that scans key field of a sorted list and determines sort-points in the key field and (2) a key field marker, associated with the sort-point identifier, that associates marks with the key field based on the sort-points and causes at least a portion of the sorted list and the associated marks to be displayed on the display device.

Although the present invention has been described in detail, those skilled in the art should understand that they can make various changes, substitutions and alterations herein without departing from the spirit and scope of the invention in its broadest form.

What is claimed is:

1. A system for displaying a sorted list on a display device, comprising:

a sort-point identifier that scans a key field of a sorted list and determines sort-points in said key field; and a key field marker, associated with said sort-point identifier, that associates marks with said key field based on said sort-points and causes at least a portion of said sorted list and said associated marks to be displayed on said display device.

2. The system as recited in claim 1 wherein said marks are selected from the group consisting of:
   alphanumeric characters,
   special characters,
   graphics characters,
   icons,
   typefaces, and
   text attributes.

3. The system as recited in claim 1 wherein said marks are spaces separating said sort-points.

4. The system as recited in claim 1 wherein said sort-point identifier and said key field marker are associated with a computer program selected from the group consisting of:
   an electronic mail program,
   a word processor,
   a contact manager, and
   an operating system.

5. The system as recited in claim 1 wherein said key field is selectable.

6. The system as recited in claim 1 wherein said key field is selected from the group consisting of:
   sender name,
   date sent,
   subject,
   filename,
   file extension,
   file size,
   file type,
   date created, and
   date modified.

7. The system as recited in claim 1 further comprising a computer having data processing and storage circuitry and said display device.

8. A method of displaying a sorted list on a display device, comprising:
   scanning a key field of a sorted list;
   determining sort-points in said key field;
   associating marks with said key field based on said sort-points; and
   causing at least a portion of said sorted list and said associated marks to be displayed on said display device.

9. The method as recited in claim 8 wherein said marks are selected from the group consisting of:
   alphanumeric characters,
   special characters,
   graphics characters,
   icons,
   typefaces, and
   text attributes.

10. The method as recited in claim 8 wherein said marks are spaces separating said sort-points.

11. The method as recited in claim 8 wherein said scanning, determining, associating and causing are carried out in a computer program selected from the group consisting of:
    an electronic mail program,
    a word processor,
    a contact manager, and
    an operating system.

12. The method as recited in claim 8 further comprising selecting said key field.

13. The method as recited in claim 8 wherein said key field is selected from the group consisting of:
    sender name,
    date sent,
    subject,
    filename,
    file extension,
    file size,
    file type,
    date created, and
    date modified.

14. The method as recited in claim 8 wherein said scanning, determining, associating and causing are carried out in a computer having data processing and storage circuitry and said display device.

15. A computer, comprising:
    data processing and storage circuitry that contains a sorted list;
    a display device capable of displaying said sorted list; and
    a system for displaying said sorted list on said display device, including:
       a sort-point identifier that scans a key field of said sorted list and determines sort-points in said key field, and
       a key field marker, associated with said sort-point identifier, that associates marks with said key field based on said sort-points and causes at least a portion of said sorted list and said associated marks to be displayed on said display device.

16. The computer as recited in claim 15 wherein said marks are selected from the group consisting of:
    alphanumeric characters,
    special characters,
    graphics characters,
    icons,
    typefaces, and
    text attributes.

17. The computer as recited in claim 15 wherein said marks are spaces separating said sort-points.

18. The computer as recited in claim 15 wherein said sort-point identifier and said key field marker are associated with a computer program selected from the group consisting of:
    an electronic mail program,
    a word processor,
    a contact manager, and
    an operating system.

19. The computer as recited in claim 15 wherein said key field is selectable.

20. The computer as recited in claim 15 wherein said key field is selected from the group consisting of:
    sender name,
    date sent,
    subject,
    filename,
    file extension,
    file size,
    file type,
    date created, and
    date modified.

* * * * *